May 17, 1932.　　C. E. VAN NORMAN　　1,858,693
CHUCK
Filed Feb. 25, 1928
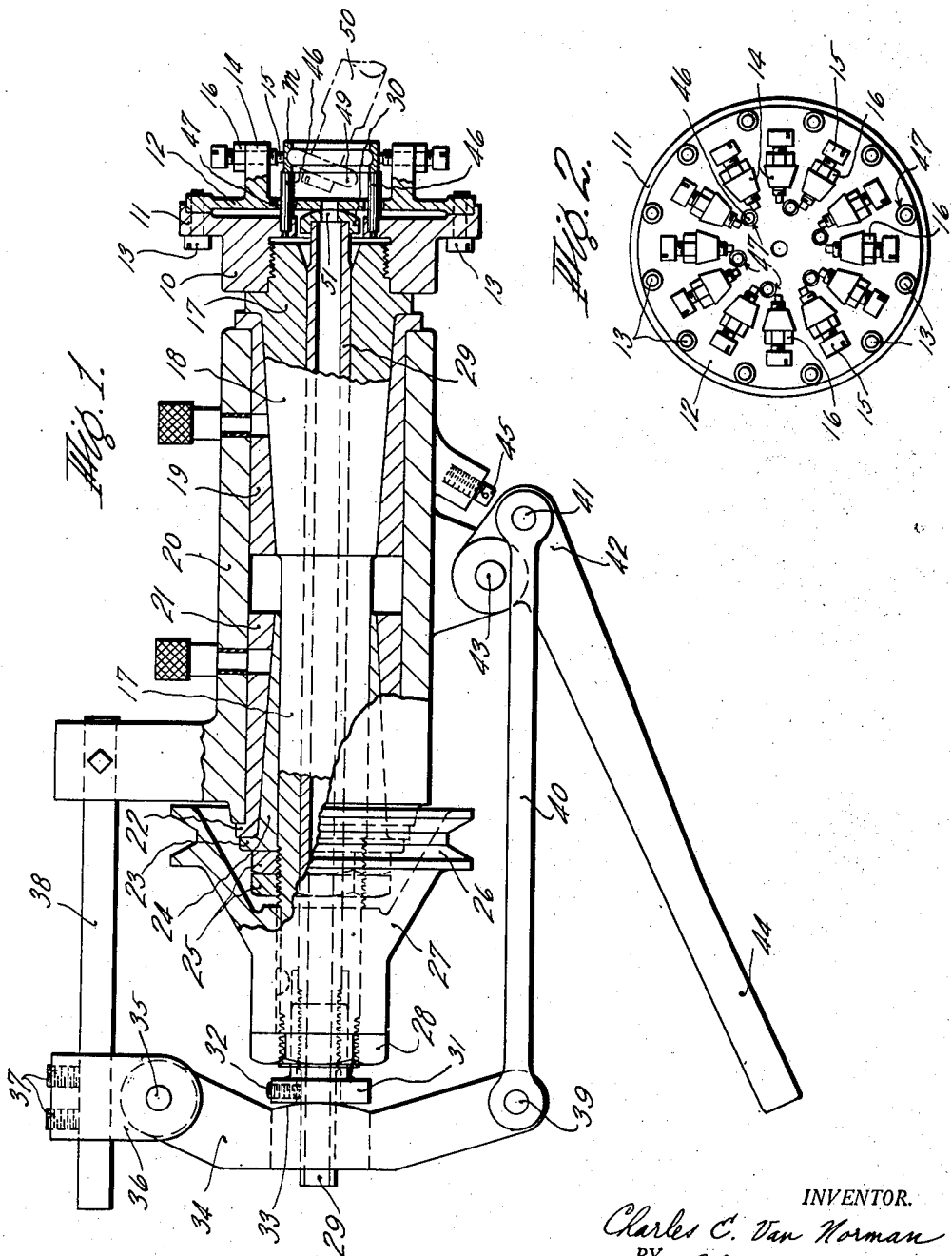
INVENTOR.
Charles C. Van Norman
BY Chapin & Neal
ATTORNEYS.

Patented May 17, 1932

1,858,693

UNITED STATES PATENT OFFICE

CHARLES E. VAN NORMAN, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS

CHUCK

Application filed February 25, 1928. Serial No. 257,050.

My invention relates to chucks for grasping and positioning objects which are to be subjected to manufacturing operations, and will be described with specific reference to a chuck designed for holding the outer race of a ball bearing while the race is being ground interiorly. The object of the invention is to provide a chuck which will combine speed of operation with great accuracy in the positioning of an article.

Referring to the drawings:

Fig. 1 is a side elevation of the preferred embodiment of chuck, partly broken away into axial section; and Fig. 2 is an end elevation thereof.

In the embodiment shown, the chuck head 10 is provided with an outwardly extending flange to which a plate 12 is secured as by a circumferential series of screws 13. The plate is made of material sufficiently flexible so that it may be bent transversely somewhat as the bottom of a pan may be forced in or out, although not to that extent. Projecting parallel to the axis of the chuck, and arranged about a circumference within that of the plate securing screws 13, are lugs 14 through which pass screws 15 secured in adjusted position by lock nuts 16. The inner ends of these screws are finished to provide grasping and bearing surfaces for holding and positioning the object to be worked upon, as will be fully described below. Preferably the screws are adjusted roughly, locked in position by nuts 16, and then collectively ground accurately to the size desired.

The chuck head 10 is screwed to a spindle 17 which may be rotated in any of the ways common in machines of this type. In order to complete the disclosure of the preferred setting of the invention, I have shown the spindle as formed with a tapered bearing portion 18 fitting within a correspondingly shaped bushing 19 within a head or housing 20. A second reversely tapered bearing is formed by a taper bushing 21 fitting within the housing and held against endwise motion towards the right in Fig. 1 by a peripheral flange 22 abutting against the end of the housing. Bearing against this is the flange 23 of a tapered sleeve 24 keyed to the spindle 17 and held against longitudinal movement by a pair of lock nuts 25. A driving pulley 26 has a hub portion 27 keyed to the spindle and held by lock nuts 28, so that the chuck and work may be rotated as desired.

Passing through the spindle 17 is a tube 29 carrying at one end a button 30 contacting with the central portion of the plate 12 so that when the tube is forced slightly to the right in Fig. 1 the plate will be bowed outwardly. To the other end of the tube a thrust collar 31 is threaded and held fixed in adjusted position by a set screw 32. To move the tube, this thrust collar is pressed against by an abutment 33 formed on a rocker 34 pivoted at 35 to a member 36, which is held by set screws 37 in adjusted position upon a rod 38 secured to the housing 20. To the free end of the rocker is pivoted at 39 a link 40, which at its other end is pivoted at 41 to a lever 42 swinging upon a bearing 43 on the housing and formed with an operating handle 44. A stop screw 45 serves to limit the motion of the handle in a direction to cause deflection of plate 12.

The chuck as so far described functions in the following manner: If the handle 44 is moved downwardly in Fig. 1, the tube 29 will be moved slightly to the right and button 30 will be pressed against the central portion of plate 12. The plate is bowed outwardly, its right hand face in Fig. 1 becoming convex. This distortion of the plate changes the angles of the lugs 14, making the lugs diverge towards the right, and causes the positioning screws 13 to move individually on radial lines away from the axis of the chuck. This motion, although slight, is sufficient to permit the object m being removed from or placed between the series of screws. When the handle is released the elasticity of the plate causes it to return to its normal position, the positioning screws 13 being thereby swung inwardly to grip the object m tightly.

Chucks of the type described are designed to deal with articles made with a high degree of accuracy, such as ball races, as the separation of their gripping devices, and the tolerance of these gripping devices when closed, are very small in amount. Normally negligible variations in outside dimensions of the article have, therefore, a relatively great effect upon the action of the chuck. It is the object of the present invention to insure accuracy in the positioning of the article in a direction axially of the chuck in two ways: first, by making the axial position of the article independent of the deflection of the plate; and second, by causing the swinging motion of the positioning screws in closing to seat the object firmly in exact axial position. These results I have accomplished by forming the axial positioning means as pins 46 secured firmly to the head 10 and passing freely through holes 47 in the plate 12. The free ends of the pins are finished off accurately, as by grinding after assembly with the head, to serve as stops for the article, which when pressed against them will be in the exact axial position desired.

Assuming now that the plate 12 has been bowed outwardly by handle 44 through the action described, an object m to be operated upon is placed between the inner ends of the positioning screws 13 and against the faced ends of pins 46. The handle 44 is then released. As they close in upon the article the ends of screws 13 each swing upon an arc, combining a motion radially towards the axis of the chuck with a motion parallel to the axis. This motion continues even after the screws contact with the article, and results in a pulling of the article tightly against the stop pins 46 with a slight slipping of the positioning screws upon the outer surface of the article.

As mentioned above, the chuck has been described in connection with a machine for grinding the inner surfaces of ball races. I have illustrated in the drawings a grinding wheel 49 mounted upon a spindle 50, and a hole 51 has been formed through the button 30 and the plate 12 for the admission of water through the spindle during the grinding operation. This setting of the invention is illustrative only, and other uses of the mechanical principles described will suggest themselves to those skilled in the art.

What I claim is:

1. A chuck comprising a rotatable head, a flexible plate secured peripherally to the head, a circular series of holding members projecting laterally from an intermediate circumference of the plate, a series of back stop pins secured to the head and passing freely through holes in the plate so as to be unaffected by bending thereof, and means for bending the plate axially so as to cause the holding members to be moved radially.

2. A chuck comprising a head, a flexible plate secured peripherally to the head, a circular series of holding members projecting laterally from an intermediate circumference of the plate, at least one stop mounted independently of the plate for limiting the position of an object in a direction axially of the members, and means for bending the plate axially so as to cause the holding members to be moved radially.

3. A chuck comprising a circular series of members presenting inwardly directed grasping surfaces, said members being constrained for radial object centering movement and for axial object positioning movement, at least one stop fixed relatively to said members and against which the object is moved by the axial positioning movement of the members, and means for moving said members through said axial positioning movement a distance in excess of that required to seat the object against the stop, whereby axial slippage of said members on the object will occur and firm positioning of the object against the stop will be assured.

4. In a diaphragm chuck, a chuck body, a diaphragm secured thereto, chuck jaws carried by said diaphragm, means for flexing said diaphragm for moving said chuck jaws, and work stop means for positioning a work piece held by said jaws, said work stop means being independent of said diaphragm.

5. In a diaphragm chuck, a chuck body, a diaphragm secured thereto, chuck jaws carried by said diaphragm, means for flexing said diaphragm for moving said chuck jaws, and work stop means secured to said chuck body and independent of said diaphragm.

6. In a diaphragm chuck, a chuck body, a diaphragm secured thereto, chuck jaws carried by said diaphragm, means for flexing said diaphragm for moving said chuck jaws, said diaphragm having an aperture therethrough, and a work stop carried by said chuck body and passing through said diaphragm so as to be independent thereof.

In testimony whereof I have affixed my signature.

CHARLES E. VAN NORMAN.